(12) United States Patent
Bahali et al.

(10) Patent No.: US 9,772,942 B2
(45) Date of Patent: Sep. 26, 2017

(54) COMMITTING TRANSACTION WITHOUT FIRST FLUSHING PROCESSOR CACHE TO NON-VOLATILE MEMORY WHEN CONNECTED TO UPS

(71) Applicant: Lenovo Enterprise Solutions (Singapore) PTE. LTD., New Tech Park (SG)

(72) Inventors: Sumanta Kumar Bahali, Cary, NC (US); John K. Langgood, Cary, NC (US); Kevin Michael Reinberg, Chapel Hill, NC (US); Kevin S. Vernon, Durham, NC (US)

(73) Assignee: Lenovo Enterprise Solutions (Singapore) PTE., LTD., New Tech Park (SG)

( * ) Notice: Subject to any disclaimer, the term of this patent is extended or adjusted under 35 U.S.C. 154(b) by 29 days.

(21) Appl. No.: 14/964,006

(22) Filed: Dec. 9, 2015

(65) Prior Publication Data
US 2017/0168937 A1    Jun. 15, 2017

(51) Int. Cl.
*G06F 12/08* (2016.01)
*G06F 12/0804* (2016.01)
*G06F 12/0868* (2016.01)

(52) U.S. Cl.
CPC ...... *G06F 12/0804* (2013.01); *G06F 12/0868* (2013.01); *G06F 2212/1032* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 2005/0174678 A1* | 8/2005 | Zayas | G11B 19/26 360/73.03 |
| 2008/0005464 A1* | 1/2008 | Lubbers | G06F 12/0804 711/113 |
| 2013/0198537 A1* | 8/2013 | Uehara | G06F 1/30 713/300 |

* cited by examiner

*Primary Examiner* — Denise Tran
(74) *Attorney, Agent, or Firm* — Jason Friday

(57) ABSTRACT

A computing system includes a processor that has a processor cache built-in, and a non-volatile memory, such as a non-volatile dual-inline memory module (NVDIMM), which is being used as system memory within the computing system. The processor processes a transaction. If the computing system is connected to an uninterruptible power supply (UPS) (and the UPS is connected to a mains power source that is currently providing power), the transaction is committed without first flushing the processor cache to the non-volatile memory. If the computing system is not connected to a UPS (and is connected to a mains power source that is currently providing power), the transaction is not committed until the processor cache has been flushed to the non-volatile memory.

17 Claims, 2 Drawing Sheets

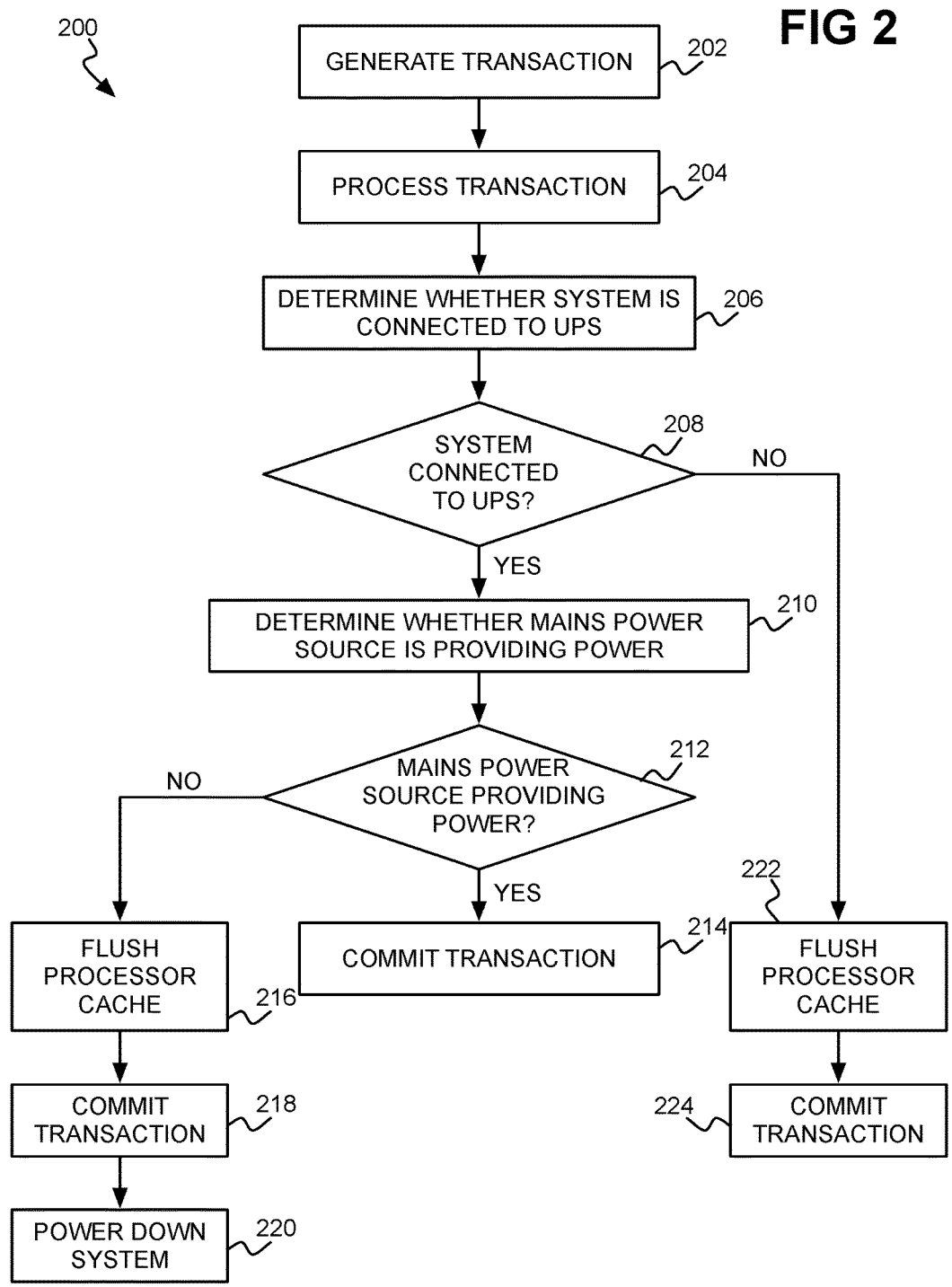

COMMITTING TRANSACTION WITHOUT FIRST FLUSHING PROCESSOR CACHE TO NON-VOLATILE MEMORY WHEN CONNECTED TO UPS

BACKGROUND

In a computing system like a computing device, such as a computer, there are generally two types of storage devices: persistent storage devices, such as hard disk drives and solid-state drives (SSDs), and storage devices that are being used as system memory within the computing system. Storage devices that are used as system memory traditionally have been volatile semiconductor memory devices, such as dynamic random-access memory (DRAM) like dual-inline memory modules (DIMMs). More recently, other types of storage devices have been used as system memory within computing systems, such as non-volatile memory like non-volatile DIMMs (NVDIMMs). One type of NVDIMM, for instance, is NVDIMM-F, which is a flash memory device.

The system memory of a computing system is generally used to store at least portions of actively running computer programs on the computing system, and at least portions of the data that these programs are currently using. The hard disk drive, SSD, or other type of persistent storage device is used to store the computer programs even when they are not running. When the programs are initiated, at least a portion thereof is loaded from the hard disk drive, SSD, or other type of persistent storage device into the system memory. When data is not currently being used by a computer program, the data may be stored on the hard disk drive, SSD, or other type of persistent storage device, and is similarly loaded into the system memory when the data is accessed by a program.

SUMMARY

An example method includes processing a transaction, by a processor of a computing system. The processor has a processor cache built-in. The method includes, in response to determining that the computing system is connected to an uninterruptible power supply (UPS), committing the transaction, by the processor, without first flushing the processor cache to a non-volatile memory of the computing system that is being used as system memory within the computing system. The method includes, in response to determining that the computing system is not connected to the UPS, flushing the processor cache to the non-volatile memory, by the processor, and after flushing the processor cache, committing the transaction, by the processor.

An example system includes a power supply to connect the system to a mains power source with or without a UPS being connected between the power supply and the mains power source. The system includes a communication link to connect to the UPS to receive information but not power from the UPS. The system includes a processor having a processor cache built-in, and a non-volatile memory to function as system memory within the computing device. The system includes an application program to run on the processor and to generate a transaction. The processor is to determine whether the power supply is connected to the UPS, via the communication link, and in response to determining that the power supply is connected to the UPS, commit the transaction without first flushing the processor cache to the non-volatile memory. The processor is to, in response to determining that the power supply is not connected to the UPS, flush the processor cache to the non-volatile memory, and only thereafter commit the transaction.

An example non-transitory computer-readable data storage medium stores computer-executable code that is executable by a processor having a processor cache built-in to perform a method. The method includes processing a transaction. The method includes, in response to determining that a computing system including the processor is connected to a UPS and that the UPS is connected to a mains power source that is currently providing power, committing the transaction without first flushing the processor cache to a non-volatile memory of the computing system that is being used as system memory within the computing system. The method includes, in response to determining that the computing system is not connected to the UPS and is connected to the mains power source that is currently providing power, flushing the processor cache to the non-volatile memory, and only after flushing the processor cache, committing the transaction.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of a method to commit transactions more quickly when an uninterruptible power supply (UPS) is connected between a computing device and a mains power source.

DETAILED DESCRIPTION

Figure 1:
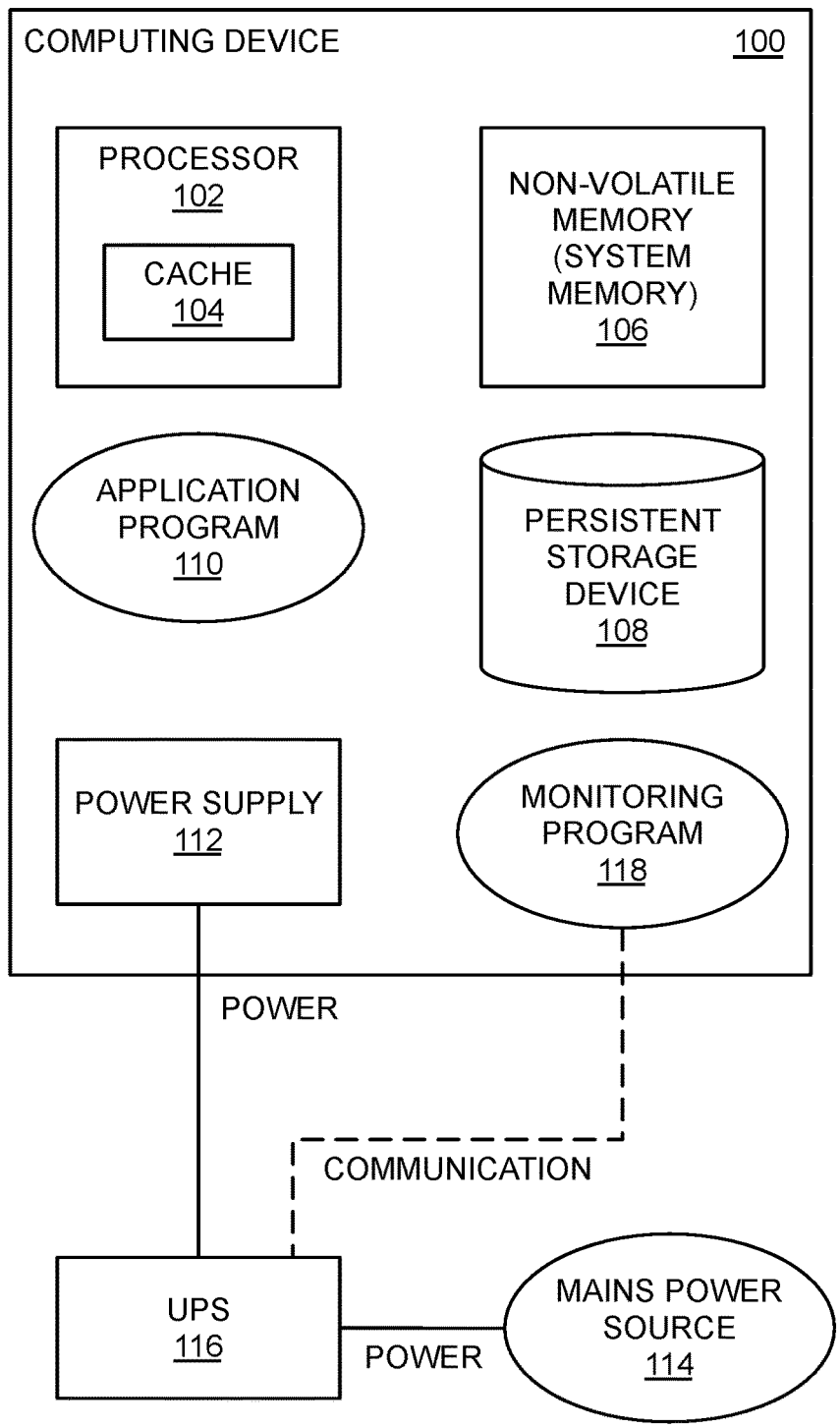
FIG. 1 is a diagram of an example computing device including a processor with a built-in cache and non-volatile system memory.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, computing systems like computers typically have two types of storage devices: system memory, including non-volatile memory like dual-inline memory modules (NVDIMMs), and storage devices meant for storing computer programs and data that is not currently be used, such as hard disk drives and solid state drives (SSDs). Computing systems are used to run application programs. Some types of application programs, such as database programs and messaging programs, are transaction-oriented.

An application program that uses transactions ensures that the data processing that is performed in accordance with a given transaction either is successfully completed in its entirety or is not. That is, transaction processing is atomic. A given transaction can be guaranteed to be completed in its entirety. This ensures that if a computing system malfunctions or loses power while processing a transaction, it is known which transactions have been completed and which have not. Examples of transactions, for instance, include the transmission of messages, the updating of records of a database, and so on.

When a transaction is generated and then processed, the transaction is not considered to have been completed in its entirety until it has been committed. A committed transaction, in other words, is guaranteed to have been completed. Even if a computing system malfunctions or loses power immediately after a transaction has been committed, it can be guaranteed that because the transaction has been committed, it has been completed successfully and no data can be lost.

The utilization of non-volatile memory as system memory, such as NVDIMMs, can assist in transaction commitment. Specifically, a computing system that does not use non-volatile memory as system memory cannot guarantee that a transaction has been completed successfully until the transaction's data has been stored to persistent storage like a hard disk drive or an SSD. Therefore, if volatile memory, such as dynamic random-access memory (DRAM), is being used as system memory, the data of a transaction has to be copied from system memory to a hard disk drive or an SSD before the transaction can be committed.

However, if non-volatile memory is used as system memory, a transaction can be committed before the data of a transaction has been copied to a hard disk drive or an SSD from the system memory. This is because non-volatile memory retains its contents even if, for instance, the computing system of which the memory is a part loses power. Although the usage of non-volatile memory can result in faster transaction commitment than if volatile memory is instead used as system memory—because a transaction can be committed before being copied to a hard disk drive or an SSD—application programs that are transaction-oriented still suffer from performance constraints.

Specifically, when a processor having a processor cache built-in, such as level-one (L1), level-two (L2), and/or level-three (L3) caches, processes a transaction, at least part of the transaction processing results are likely to remain in the processor cache. This means that, if, for instance, a computing system including such a processor as well as non-volatile system memory loses power, it cannot be guaranteed that the data of the transaction is not lost. This is because the processor cache is not non-volatile, unlike the system memory. As such, if a portion of the transaction's data (i.e., a portion of the transaction processing results) remains in the processor cache, this portion will be lost if the computing system loses power.

A limited solution to this problem is to not commit a transaction until a processor cache flush process, command, or operation, which can also be referred to as a write-back cache processor, command, or operation, has been completed. Flushing the processor cache moves the transaction's data (i.e., the transaction processing results) completely from this cache to system memory. When the system memory is non-volatile memory, this means that as soon as the processor cache flush has been completed, the transaction can be committed. Even if the computing system loses power immediately after the processor cache flush occurs, no transaction data is lost, because the data is stored in non-volatile memory.

However, from a performance standpoint, a processor cache flush is an expensive operation. The purpose of having a built-in cache within a processor is to increase processing performance by reducing the need for the processor to have to retrieve data "off chip" from system memory. By forcing the processor cache to flush its contents back to system memory to commit a transaction, these performance benefits are curtailed. Application programs like database programs and messaging programs that utilize transactions therefore do not perform as well.

Disclosed herein are techniques that alleviate these shortcomings. A computing system includes a processor that has a processor cache built-in, and a non-volatile memory, such as an NVDIMM, which is used as system memory within the computing system. The processor processes a transaction. If the computing system is connected to an uninterruptible power supply (UPS) (and the UPS is connected to a mains power source that is currently providing power), the transaction is committed without first flushing the processor cache to the non-volatile memory. Only if the computing system is not connected to a UPS (and is connected to a mains power source that is currently providing power), is the transaction not committed until the processor cache has been flushed to the non-volatile memory.

The techniques disclosed herein thus leverage the usage of a UPS to commit transactions even when at least a portion of the transaction processing results still reside in the processor cache. If mains power is lost, the battery backup provided by the UPS ensures that no transaction data is lost. Therefore, when mains power is lost and the computing system is being powered by the UPS's battery, the processor cache is flushed back to non-volatile system memory, such as an NVDIMM. The computing system can then be powered down in a controlled manner if desired, such as by initiating the operating system's shutdown procedure, which typically closes all open application programs and then proceeds to turn off the computing system.

FIG. 1 shows an example computing device 100. The computing device 100 may be a computer, such as a desktop computer, a server computer or server, a laptop computer, and so on. The computing device 100 may be considered a computing system, or it may be one of a number of such computing devices of a computing system.

The computing device 100 includes a processor 102 having a built-in processor cache 104. The processor cache 104 is built into the processor 102 in that it is within the same integrated circuit (IC) as the processing core(s) of the processor 102, and may even be on the same die as the processing core(s) of the processor 102. The processor cache 104 permits the processor 102 to store small amounts of data while performing processing operations, without having to go "off chip" to retrieve the data. Examples of the processor cache 104 include L1 and L2 caches, as well as some types of L3 cache.

The computing device 100 includes non-volatile memory 106 that serves or functions as the system memory of the computing device 100. An example of such non-volatile memory 106 that can serve as system memory includes one or more NVDIMMs, such as one or more NVDIMM-Fs. The non-volatile memory 106 may be a module, such as an NVDIMM, inserted into a corresponding socket of the computing device 100, or may be an integrated circuit (IC) permanently attached within the computing device 100, such as by being soldered to a mainboard thereof. As described above, the system memory of the computing device 100 stores at least portions of computer programs currently running on the computing device 100, and at least portions of data currently being accessed by these computer programs. The system memory—that is, the non-volatile memory 106, may have its own memory cache, which if present is separate from the built-in processor cache 104 of the processor 102.

The computing device 100 can include a persistent storage device 108 as well, such as a hard disk drive, an SSD, and so on. The capacity of the persistent storage device 108 is generally larger than the capacity of the non-volatile memory 106. As described above, the persistent storage device 108 stores computer programs not currently being executed on the computing device 100, as well as data that is not currently being accessed by these computer programs. As such, it is noted that the non-volatile memory 106 being used as the system memory of the computing device 100 is used in a different manner than the persistent storage device 108 is.

The computing device 100 includes an application program 110. The processor 102 executes the application program 110. The application program 110 may be stored within the persistent storage device 108, and portions thereof loaded into the non-volatile memory 106 when the program 110 is running. The application program 110 is transaction-oriented. As such, the application program 110 can be a database program, a messaging program, or another type of transaction-oriented program.

A transaction is more specifically an atomic transaction. That is, it is said to either be completely performed, or not be performed at all, and thus is atomic in that it can be considered to be indivisible. Even when a transaction is generated by the application program 110 and is being processed by the processor 102, the transaction is not considered to have been performed (completely) until the transaction has been committed. That is, a transaction succeeds or fails as a complete unit, and cannot be considered as having been partially completed.

The computing device 100 includes a power supply 112. The power supply 112 can convert alternating current (AC) to direct current (DC), the latter which is then used to power the components of the computing device 100, such as the processor 102, the non-volatile memory 106, the persistent storage device 108, as well as other hardware components not depicted in FIG. 1. The power is provided to the power supply 112 of the computing device 100 from external to the device 100.

The power supply 112 of the computing device 100 is thus connected to a mains power source 114. There can be an intervening UPS 116 between the power supply 112 and the mains power source 114, as well as other power devices such as surge protectors, and so on. The mains power source 114 may provide power in the form of utility power provided by an electrical utility to the premises at which the computing device 100 is located. For instance, the power supply 112 may plug into the UPS 116, which itself plugs into the mains power source 114. The mains power source 114 may provide power in another form as well, such as generator power provided by an on-site gas, natural gas, propane, or battery-powered generator that uses such fuel to generate power.

The UPS 116 is a power device that can provide emergency power to the computing device 100 when the mains power source 114 fails (i.e., when the mains power source 114 is no longer providing power). The UPS 116 differs from an auxiliary or emergency power system, such as an automatic or manual standby generator, in that it provides near-instantaneous power when the mains power source 114 fails. The UPS 116 may include one or more batteries, for instance, that can provide power for a short period of time. When the UPS 116 detects that power is no longer being provided by the mains power source 114, the UPS 116 nearly instantaneously switches the power provided to the power supply 112 of the computing device 100 from the mains power source 114 to its built-in battery or other power source. This switching can occur in milliseconds or less, such that the computing device 100 can be considered to continuously receive power while this switching occurs. The UPS 116 is sized so that its built-in power source is sufficient to power the computing device 100 to at a minimum flush the processor cache 104 to the non-volatile memory 106.

The computing device 100 can include a monitoring program 118, which may be in the form a device driver, a daemon, a thread, or an agent, for instance. The monitoring program 118 receives communication from the UPS 116. For example, the UPS 116 may provide a serial connection, such as an RS-232 or a universal serial bus (USB) connection, to the computing device 100. Over this connection, the UPS 116 can inform the monitoring program 118 whether the UPS 116 is providing power from its built-in battery or from the mains power source 114. The UPS 116 can also inform the monitoring program 118 how long it can power the computing device 100 from its built-in battery based on the power currently being drawn by the device 100. The monitoring program 118 can be used in conjunction with the processor 102 and/or the application program 110 to control how transactions generated by the application program 110 are committed after being processed by the processor 102.

In general, if the UPS 116 is providing power from the mains power source 114 to the computing device 100, then the transactions are committed as soon as they have been completely processed by the processor 102, without flushing the processor cache 104 back to the non-volatile memory 106. If the UPS 116 is providing power from its own power source (i.e., the computing device 100 is on "battery power" supplied by the UPS 116), then the transactions may be committed only after the cache 104 has been flushed to the non-volatile memory 106. Similarly, if no UPS 116 is connected to the computing device 100—i.e., the computing device 100 is directly plugged into an outlet of the mains power source 114—then the transactions may be committed only after the cache 104 has been flushed to the non-volatile memory 106. The monitoring program 118 may detect that the computing device 100 is not connected to a UPS 116 if it does not receive any UPS communication.

FIG. 2 shows an example method 200 to commit transactions generated by the application program 110 more quickly when the UPS 116 is connected between the computing device 100 and the mains power source 114. The method 200 is performed by the processor 102, under the direction of the application program 110 for some parts and under the direction of the monitoring program 118 for others. That is, the processor 102 executes the programs 110 and 118, which together cause the processor 102 to perform the method 200.

The application program 110 generates a transaction (202), which is then processed by the processor 102 under the direction of the program 110 (204). The processor 102 may retrieve data from the non-volatile memory 106 in processing the transaction, and store this data within the processor cache 104. In at least some instances, processing the transaction results in a portion of the transaction processing results remaining in the processor cache 104 and not being immediately stored within the non-volatile memory 106. The transaction processing results may be new data that is created via the processing of the transaction, such as based on the existing data retrieved from the non-volatile memory 106 and temporarily cached within the processor cache 104. As another example, the transaction processing results may be the existing data retrieved from the non-volatile memory 106 and temporarily cached within the processor cache 104, but which may be modified or updated as a result of the transaction processing.

The monitoring program 118 determines whether the computing system—e.g., the computing device 100—is connected to a UPS 116 (206). The monitoring program 118 may determine this based on whether it has received communication from a UPS 116 over a communication link such as a serial connection between the computing device 100 and the UPS 116. If the computing system is connected to the UPS 116 (208), then the monitoring program 118 further can determine whether the mains power source 114 is currently providing power to the computing device 100 via the UPS 116 (210). That is, the monitoring program 118 can determine whether the computing device 100 is currently being powered by the built-in power source of the UPS 116, such as a battery, or by the mains power source 114. The former may result from the UPS 116 switching to battery power if the UPS 116 is unplugged from the mains power source 114, or if the mains power source 114 has failed. The monitoring program 118 can make this determination based on communication that it has received from the UPS 116.

If the mains power source 114 is currently providing power to the computing device 100 (212), then the transaction is committed (214). It is noted that after the transaction processing of part 204 is performed, the transaction has been actually completed, but it is not considered to have been completed until the transaction is actually committed. In the method 200, then, the transaction is committed without first flushing the processor cache 104 to the non-volatile memory 106 only if the computing device 100 is connected to UPS 116, and generally also only if the mains power source 114 is providing the power by which the computing device 100 is operating. In this respect, it is noted that the processor cache 104 will be flushed to the non-volatile memory 106 at some point, but when this flushing occurs is independent of the transaction commitment in part 214, and instead is dictated by the need of the processor 102 to free up space in the cache 104 to store data other than the transaction processing results. Thus, while the processor cache 104 may be flushed to the non-volatile memory 106 before the transaction is committed in part 214, such flushing is coincidental, and the transaction commitment of part 214 would have occurred even if such processor cache 104 flushing had not occurred.

If the computing device 100 is connected to the UPS 116, but the mains power source 114 is not providing power to the computing device 100 through the UPS 116 (212), then the processor cache 104 is first flushed to the non-volatile memory 106 (216) before the transaction is committed (218). Thus, when the UPS 116 is providing emergency or backup power to the computing device 100 from its own battery or other power source, the transaction is not committed in part 218 until the processor cache 104 has been successfully flushed in part 216. In one implementation, the computing device 100 may further be powered down in a controlled manner (220), such as via the monitoring program 118, to ensure that the UPS 116 does not deplete its power source before the device 100 can be shut down in a controlled manner. As noted above, the computing device 100 is typically powered down in a controlled manner via the initiation of a shutdown process provided by the operating system that may be running on the computing device 100.

If the computing device 100 is not connected to the UPS 116 (208), then the processor cache 104 is similarly first flushed to the non-volatile memory 106 (222) before the transaction is committed (224). Thus, when the mains power source 114 is providing power to the computing device 100 but there is no backup power source in the form of a UPS 116, then the transaction is not committed in part 224 until the processor cache 104 has been successfully flushed in part 216. Therefore, in the three scenarios covered by the method 200—(1) UPS 116 present and mains power source 114 providing power; (2) UPS 116 present and providing power and mains power source 114 not providing power; and (3) UPS 116 not present and mains power source 114 providing power—the transaction generated in part 202 and processed in part 204 is committed without first flushing the processor cache 104 only in the first scenario. In the other two scenarios, the transaction is not committed until the processor cache 104 has been successfully flushed to the non-volatile memory 106.

As such, the techniques disclosed herein provide for performance benefits when there is a UPS 116 interconnecting the computing device 100 and the mains power source 114, in the typical scenario in which the mains power source 114 is providing power to the computing device 100 through the UPS 116. This is because transactions can be committed without having to first flush the contents of the processor cache 104, which may include transaction processing results, to the non-volatile memory 106. Transaction commitment in this scenario thus avoids the performance penalty exacted when having to wait for the processor cache 104 to be flushed. In the techniques disclosed herein, this performance penalty is exacted when the UPS 116 is connecting the computing device 100 to the mains power source 114 only in the relatively infrequent if not rare situation in which the mains power source 114 is not providing power to the computing device 100, and instead the built-in power source of the UPS 116 is.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:
1. A method comprising:
processing a transaction, by a processor of a computing system, the processor having a processor cache built-in;
in response to determining that the computing system is connected to an uninterruptible power supply (UPS) and in response to determining that the UPS is connected to a mains power source that is currently providing power, committing the transaction, by the processor, without first flushing the processor cache to a non-volatile memory of the computing system that is being used as system memory within the computing system; and
in response to determining that the computing system is not connected to the UPS, flushing the processor cache to the non-volatile memory, by the processor, and after flushing the processor cache, committing the transaction, by the processor.

2. The method of claim 1, wherein processing the transaction results in at least a portion of transaction processing results remaining in the processor cache and not being stored within the non-volatile memory.

3. The method of claim 1, further comprising:
in response to determining that the computing system is connected to the UPS and in response to determining that the UPS is connected to the mains power source but that the mains power source is not currently providing power,
flushing the processor cache to the non-volatile memory, by the processor, and after flushing the processor cache, committing the transaction, by the processor.

4. The method of claim 3, further comprising:
in response to determining that the computing system is connected to the UPS and in response to determining that the UPS is connected to the mains power source but that the mains power source is not currently providing power,
after flushing the processor cache and after committing the transaction, powering down the computing system, by the processor, in a controller manner.

5. The method of claim 1, wherein the transaction is committed without first flushing the processor cache only when the computing system is connected to the UPS.

6. The method of claim 1, wherein the non-volatile memory is being used as the system memory within the computing device insofar as the non-volatile memory is not being used in a same manner in which a hard disk drive is used within the computing system.

7. The method of claim 1, wherein the non-volatile memory is a non-volatile dual-inline memory module (NVDIMM).

8. The method of claim 1, wherein the UPS has built-in power sufficient to at a minimum flush the processor cache to the non-volatile memory.

9. The method of claim 1, further comprising:
generating the transaction, by an application program being executed by the processor of the computing system.

10. The method of claim 9, wherein the application program is one of a database application program and a messaging application program.

11. A system comprising:
a power supply to connect the system to a mains power source with or without an uninterruptible power supply (UPS) being connected between the power supply and the mains power source;
a communication link to connect to the UPS to receive information but not power from the UPS;
a processor having a processor cache built-in;
a non-volatile memory to function as system memory within a computing device; and
an application program to run on the processor and to generate a transaction,
wherein the processor is to:
determine whether the power supply is connected to the UPS, via the communication link;
in response to determining that the power supply is connected to the UPS and in response to determining that the mains power source is currently providing power, commit the transaction without first flushing the processor cache to the non-volatile memory; and
in response to determining that the power supply is not connected to the UPS, flush the processor cache to the non-volatile memory, and only thereafter commit the transaction.

12. The system of claim 11, wherein the processor is to process the transaction, resulting in at least a portion of transaction processing results remaining in the processor cache and not being stored within the non-volatile memory.

13. The system of claim 11, wherein the processor is further to:
in response to determining that the power supply is connected to the UPS and in response to determining that the mains power source is not currently providing power,
flush the processor cache to the non-volatile memory, and only thereafter commit the transaction.

14. The system of claim 13, wherein the processor is further to:
in response to determining that the power supply is connected to the UPS and in response to determining that the mains power source is not currently providing power,
after flushing the processor cache and after committing the transaction, power down the computing system in a controller manner.

15. A non-transitory computer-readable data storage medium storing computer-executable code that is executable by a processor having a processor cache built-in to perform a method comprising:
processing a transaction;
in response to determining that a computing system including the processor is connected to an uninterruptible power supply (UPS) and that the UPS is connected to a mains power source that is currently providing power, committing the transaction without first flushing the processor cache to a non-volatile memory of the computing system that is being used as system memory within the computing system; and
in response to determining that the computing system is not connected to the UPS and is connected to the mains power source that is currently providing power, flushing the processor cache to the non-volatile memory, and only after flushing the processor cache, committing the transaction.

16. The non-transitory computer-readable data storage medium of claim 15, wherein processing the transaction results in at least a portion of transaction processing results remaining in the processor cache and not being stored within the non-volatile memory.

17. The non-transitory computer-readable data storage medium of claim 15, wherein the method further comprises:
in response to determining that the computing system is connected to the UPS and in response to determining that the UPS is connected to the mains power source but that the mains power source is not currently providing power,
flushing the processor cache to the non-volatile memory, and only after flushing the processor cache, committing the transaction.

* * * * *